United States Patent
Matsuura

(10) Patent No.: US 7,896,371 B2
(45) Date of Patent: Mar. 1, 2011

(54) ALL TERRAIN VEHICLE WITH DOUBLE WISHBONE SUSPENSION

(75) Inventor: Tatsuya Matsuura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 452 days.

(21) Appl. No.: 11/965,270

(22) Filed: Dec. 27, 2007

(65) Prior Publication Data

US 2009/0014976 A1 Jan. 15, 2009

Related U.S. Application Data

(60) Provisional application No. 60/949,573, filed on Jul. 13, 2007.

(51) Int. Cl.
B60G 3/18 (2006.01)
B62K 5/00 (2006.01)
B62K 19/00 (2006.01)

(52) U.S. Cl. .................. 280/124.135; 280/124.145; 280/779; 280/781; 180/311

(58) Field of Classification Search .......... 280/124.134, 280/124.135, 124.154, 124.145, 779, 781; 180/908, 311, 312, 210
See application file for complete search history.

(56) References Cited

U.S. PATENT DOCUMENTS

| | | | | |
|---|---|---|---|---|
| 4,535,869 A * | 8/1985 | Tsutsumikoshi et al. | .... | 180/311 |
| 5,699,872 A * | 12/1997 | Miyakawa et al. | ......... | 180/291 |
| 5,855,250 A * | 1/1999 | Nishi | ......................... | 180/312 |
| 6,170,841 B1 * | 1/2001 | Mizuta | ......................... | 280/89 |
| 6,412,856 B1 * | 7/2002 | Kajikawa et al. | ....... | 296/203.01 |
| 6,523,634 B1 * | 2/2003 | Gagnon et al. | .............. | 180/291 |
| 7,004,484 B1 * | 2/2006 | Chevalier | ............... | 280/86.751 |
| 7,182,169 B2 * | 2/2007 | Suzuki | ....................... | 180/426 |
| 7,407,031 B2 * | 8/2008 | Hayashi et al. | ............. | 180/311 |
| 7,510,199 B2 * | 3/2009 | Nash et al. | ............ | 280/124.135 |
| 7,571,918 B2 * | 8/2009 | Bowers | ............... | 280/124.138 |
| 7,618,063 B2 * | 11/2009 | Takeshima et al. | .......... | 280/785 |
| 2004/0169347 A1 * | 9/2004 | Seki | ..................... | 280/124.134 |
| 2006/0066069 A1 * | 3/2006 | Yanai et al. | ........... | 280/124.135 |
| 2006/0272879 A1 * | 12/2006 | Hayashi et al. | ............. | 180/312 |
| 2007/0090621 A1 * | 4/2007 | Vigen | ................... | 280/124.134 |
| 2007/0170682 A1 * | 7/2007 | Kinugasa | ............. | 280/124.135 |
| 2008/0277184 A1 * | 11/2008 | Marleau | ..................... | 180/312 |

FOREIGN PATENT DOCUMENTS

JP S64-032985 A 2/1989

* cited by examiner

*Primary Examiner*—Paul N. Dickson
*Assistant Examiner*—George D. Spisich
(74) *Attorney, Agent, or Firm*—Keating & Bennett, LLP

(57) ABSTRACT

An all terrain vehicle includes a front wheel, a body frame and a double wishbone type suspension for suspending the front wheel. The body frame has a triangular frame part formed into the shape of a triangle in side view of the vehicle. The triangular frame part includes a first frame extending downward to the front side of the vehicle, a second frame extending downward to the rear side of the vehicle from an upper end of the first frame and a third frame connected to a lower end of the first frame and a lower end of the second frame. The double wishbone type suspension includes an upper arm, which is pivotably supported on the first frame and the second frame so as to be swingable, and a lower arm, which is pivotably supported on the third frame so as to be swingable.

18 Claims, 6 Drawing Sheets

ALL TERRAIN VEHICLE WITH DOUBLE WISHBONE SUSPENSION

This application claims priority from and incorporates by reference U.S. Provisional Patent Application Ser. No. 60/949,573 filed Jul. 13, 2007, entitled "All Terrain Vehicle With Double Wishbone Type Suspension."

BACKGROUND OF THE INVENTION

1. Field of the Invention

The present invention relates to an all terrain vehicle with double wishbone type suspension comprising a front wheel, a body frame and a double wishbone type suspension for suspending the front wheel.

2. Description of the Related Art

Up to now, known has been an all terrain vehicle (ATV) comprising a front wheel, a body frame and a double wishbone type suspension for suspending the front wheel. The double wishbone type suspension generally comprises an upper arm and a lower arm, which are formed into the shape of a triangle, and a shock absorber. The double wishbone type suspension is mounted to the body frame.

Further, also known has been an all terrain vehicle comprising a triangular frame part formed into the shape of a triangle in side view of the all terrain vehicle (Page 7 and FIG. 1 in JP-A-H01-32985, for example). Such a triangular frame part includes two oblique side frames and a bottom side frame. The two oblique side frames are connected to a center frame parallel to the bottom side frame. A side of an upper arm is pivotably supported on the center frame.

In accordance with an all terrain vehicle comprising such a triangular frame part, frame rigidity for a shock mainly from the front side of the all terrain vehicle can be improved.

In the all terrain vehicle, however, a side of the upper frame and the center frame are provided double, and therefore, there has been a room for improvement in lightening of a vehicle and reduction of manufacturing costs.

SUMMARY OF THE INVENTION

In view of the above, an object of the invention is to provide an all terrain vehicle in which rigidity of a body frame is improved with a simple structure.

In order to overcome the above-mentioned problems, the invention has the following aspects. A first aspect of the invention is an all terrain vehicle (an all terrain vehicle 10) comprising a front wheel (front wheels 20L and 20R), a body frame (a body frame 30) and a double wishbone type suspension (a double wishbone type suspension 100) for suspending the front wheel, wherein the body frame includes a triangular frame part (a triangular frame part 300L, for example) formed into the shape of a triangle in side view of the vehicle wherein the triangular frame part includes: a first frame (a first frame 310L) extending downward to the front side of the vehicle; a second frame (a second frame 320L) extending downward to the rear side of the vehicle from an upper end (an upper end 310a) of the first frame; and a third frame (a third frame 330L) connected to a lower end (a lower end 310b) of the first frame and a lower end (a lower end 320b) of the second frame, and the double wishbone type suspension includes: an upper arm (an upper arm 110) pivotably supported on the first frame and the second frame so as to be swingable; and a lower arm (a lower arm 120) pivotably supported on the third frame so as to be swingable.

The second aspect of the invention is the all terrain vehicle according to the first aspect of the invention, wherein the upper arm includes a pivotably supported part (a pivotably supported part 111) pivotably supported on the first frame and the second frame, the first frame pivotably supports a front end part (a front end part 111a) of the pivotably supported part and the second frame pivotably supports a rear end part (a rear end part 111b) of the pivotably supported part.

The third aspect of the invention is the all terrain vehicle according to the first aspect of the invention, wherein the double wishbone type suspension includes a shock absorber (a shock absorber 130) and an upper end (an upper end 130a) of the shock absorber is supported in the vicinity of a top (a top A) of the triangular frame part, the top being a connection part of the first frame and the second frame.

The fourth aspect of the invention is the all terrain vehicle according to the first aspect of the invention, wherein the body frame includes a pair of the right and left triangular frame parts (triangular frame parts 300L and 300R).

The fifth aspect of the invention is the all terrain vehicle according to the second aspect of the invention, wherein the pivotably supported part is formed from a member (a pivotably supported part 111) extending along a back and forth direction of the vehicle.

The sixth aspect of the invention is the all terrain vehicle according to the fifth aspect of the invention, wherein a middle part (a middle part 311) of the first frame and a middle part (a middle part 321) of the second frame are connected only through the pivotally supported part.

The seventh aspect of the invention is the all terrain vehicle according to the fourth aspect of the invention, further comprising a first cross member (a suspension bracket 370) for connecting the vicinities of a pair of the tops of the triangular frame parts, the tops being the connection parts of the first and second frames.

The eighth aspect of the invention is the all terrain vehicle according to the seventh aspect of the invention, wherein the double wishbone type suspension includes a shock absorber (a shock absorber 130) and an upper end (an upper end 130a) of the shock absorber is supported on the first cross member.

The ninth aspect of the invention is the all terrain vehicle according to the eighth aspect of the invention, wherein the first cross member is connected to an outer circumferential side of the triangular frame part.

The tenth aspect of the invention is the all terrain vehicle according to the first aspect of the invention, further comprising: a steering shaft (a steering shaft 71) for mounting a handle (a handle 70) for steering the front wheel; and a steering shaft supporting part (a steering bracket 360) for supporting the steering shaft, wherein the steering shaft supporting part is provided in the first frames (first frames 310L and 310R).

The eleventh aspect of the invention is the all terrain vehicle according to the fourth aspect of the invention, further comprising: a steering shaft (a steering shaft 71) for mounting a handle for steering the front wheel; and a steering shaft supporting part (a steering bracket 360) for supporting the steering shaft, wherein the steering shaft extends between the pair of right and left triangular frame parts in a vertical direction and the steering shaft supporting part is provided in a pair of the first frames (first frames 310L and 310R).

The twelfth aspect of the invention is the all terrain vehicle according to the tenth aspect of the invention, wherein the steering shaft supporting part is provided between a place the upper arm is pivotably supported on the first frame and a lower end (a lower end 310b) of the first frame.

The thirteenth aspect of the invention is the all terrain vehicle according to the fourth aspect of the invention, further comprising: a second cross member (a cross member 380) for connecting a pair of the second frames.

The fourteenth aspect of the invention is the all terrain vehicle according to the thirteenth aspect of the invention, wherein the second cross member connects the pair of second frames in the vicinity of a place the upper arm is pivotably supported on the second frame.

The fifteenth aspect of the invention is the all terrain vehicle according to the thirteenth aspect of the invention, wherein the second cross member connects the pair of second frames between the place the upper arm is pivotably supported on the second frame and an upper end (an upper end 320a) of the second frame.

The sixteenth aspect of the invention is the all terrain vehicle according to the fourth aspect of the invention, wherein the second frame has a bending part (a bending part 322) bent projectingly to the inner side in a direction of a width of the vehicle, and the bending part is formed at a middle part (a middle part 321) of the second frame.

The seventeenth aspect of the invention is the all terrain vehicle according to the second aspect of the invention, wherein the pivotably supported part is provided on the outer side of the first and second frames in the vehicle width direction.

The eighteenth aspect of the invention is the all terrain vehicle according to the second aspect of the invention, wherein the pivotably supported part is provided on the inner side of the first and second frames in the vehicle width direction.

The nineteenth aspect of the invention is the all terrain vehicle according to the sixteenth aspect of the invention, wherein the bending part is located in the vicinity of a part (an upper bracket 342L) pivotably supporting a rear end part (a rear end part 111b) of the pivotably supported part.

BRIEF DESCRIPTION OF THE DRAWINGS

The invention will be described with reference to the accompanying drawings, wherein like numbers reference like elements, and wherein.

DESCRIPTION OF THE EMBODIMENTS

Now, an embodiment of the invention will be described. Concretely, described will be (1) a schematic whole structure of an all terrain vehicle and (2) a structure of a front part of the vehicle.

In the following description of the drawings, the same or similar parts are marked with the same or similar reference signs and numerals. It should be noted, however, that the drawings are simplified diagrams and each ratio of dimensions or the like is different from actual one.

Accordingly, a concrete dimension and such should be determined, taking the following description into account. Moreover, it goes without saying that the drawings also include a difference of a relation or a ratio of dimensions from each other.

(1) Schematic Whole Structure of All Terrain Vehicle

Figure 1:
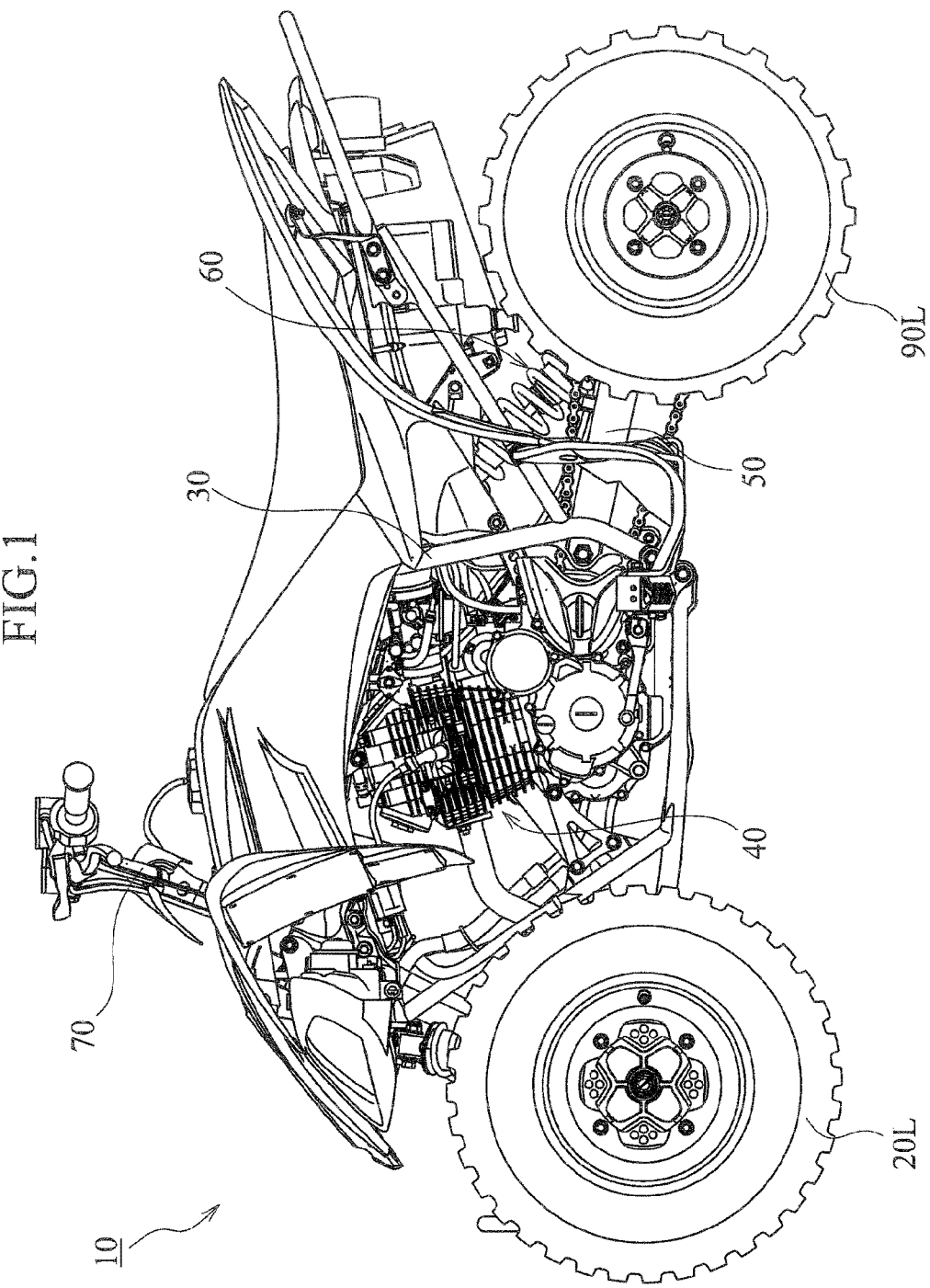
FIG. 1 is a left side view of an all terrain vehicle 10 in accordance with an embodiment of the invention.
Figure 2:
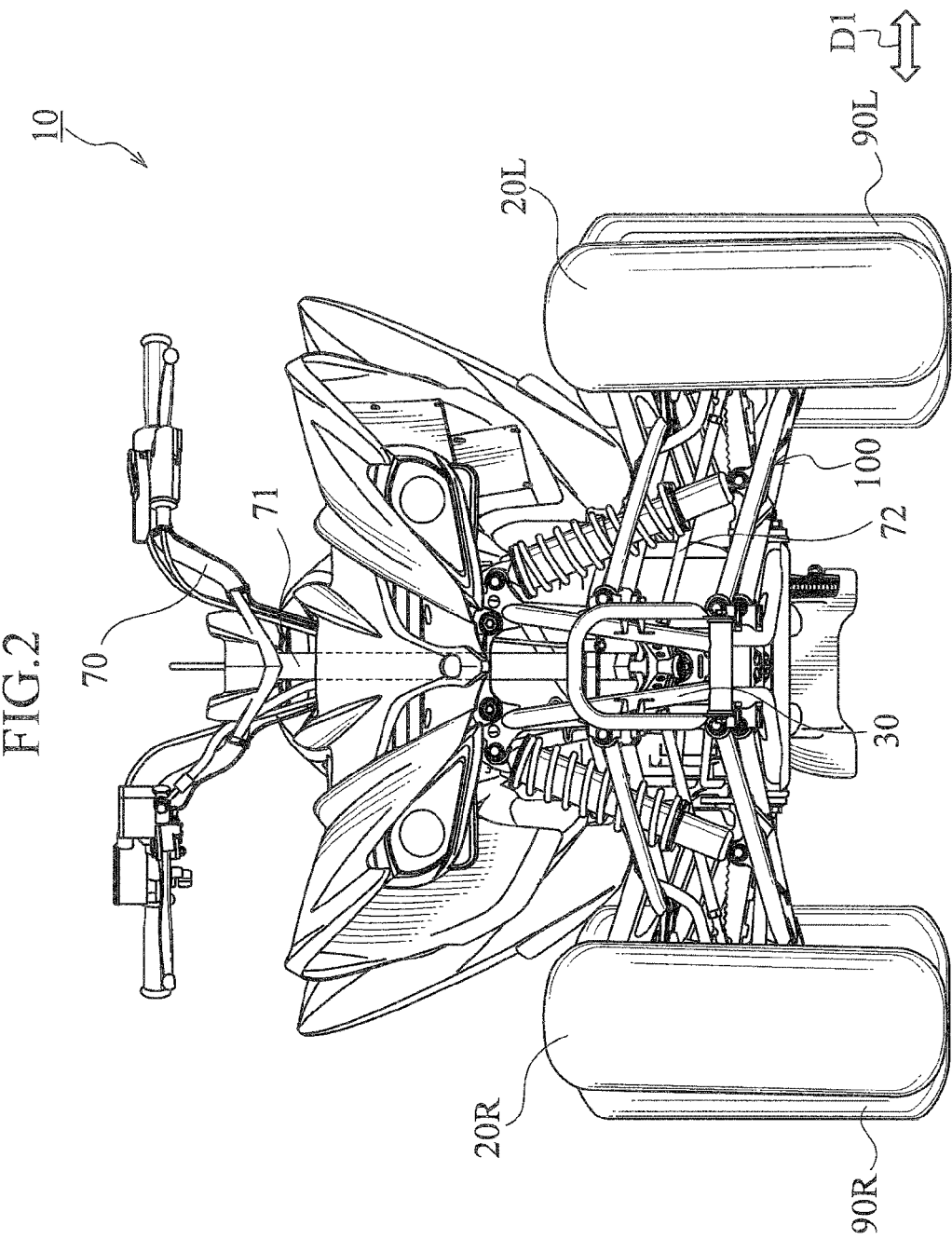
FIG. 2 is a front view of an all terrain vehicle 10 in accordance with an embodiment of the invention.

FIG. 1 is a left side view of an all terrain vehicle 10 in accordance with the embodiment. FIG. 2 is a front view of the all terrain vehicle 10. The all terrain vehicle 10 is a four-wheeled vehicle capable of running in all terrains such as mud, sandy beaches, snowy roads, paved roads and mountain paths.

As shown in FIGS. 1 and 2, the all terrain vehicle 10 includes front wheels 20L and 20R and rear wheels 90L and 90R.

A body frame 30 forms a frame of the all terrain vehicle 10. To the body frame 30, mounted are an engine 40, a rear arm 50, a rear cushion unit 60 and such.

The engine 40 generates power to transmit the generated power to the rear wheels 90L and 90R through a drive chain 41.

The rear arm 50 holds the rear wheels 90L and 90R so that the rear wheels 90L and 90R can swing in a substantially vertical direction. Concretely, the rear arm 50 is supported on the body frame 30 so as to be swingable.

The rear cushion unit 60 is connected to the body frame 30 and the rear arm 50. The rear cushion unit 60 absorbs a shock received by the rear wheels 90L and 90R.

A handle 70 is connected to the front wheels 20L and 20R through a steering shaft 71 and a tie rod 72.

The handle 70 is used for steering the front wheels 20L and 20R. The handle 70 is mounted to the steering shaft 71.

The all terrain vehicle 10 comprises a double wishbone type suspension 100 for suspending the front wheels 20L and 20R.

(2) Structure of Front Part of Vehicle

Now, described will be a structure of a front part of the all terrain vehicle 10, made reference to FIGS. 3 to 6. Concretely, described will be (2.1) a structure of a front suspension, (2.2) a shape of a body frame and (2.3) a shape of a steering shaft supporting part.

(2.1) Structure of Front Suspension

Figure 3:
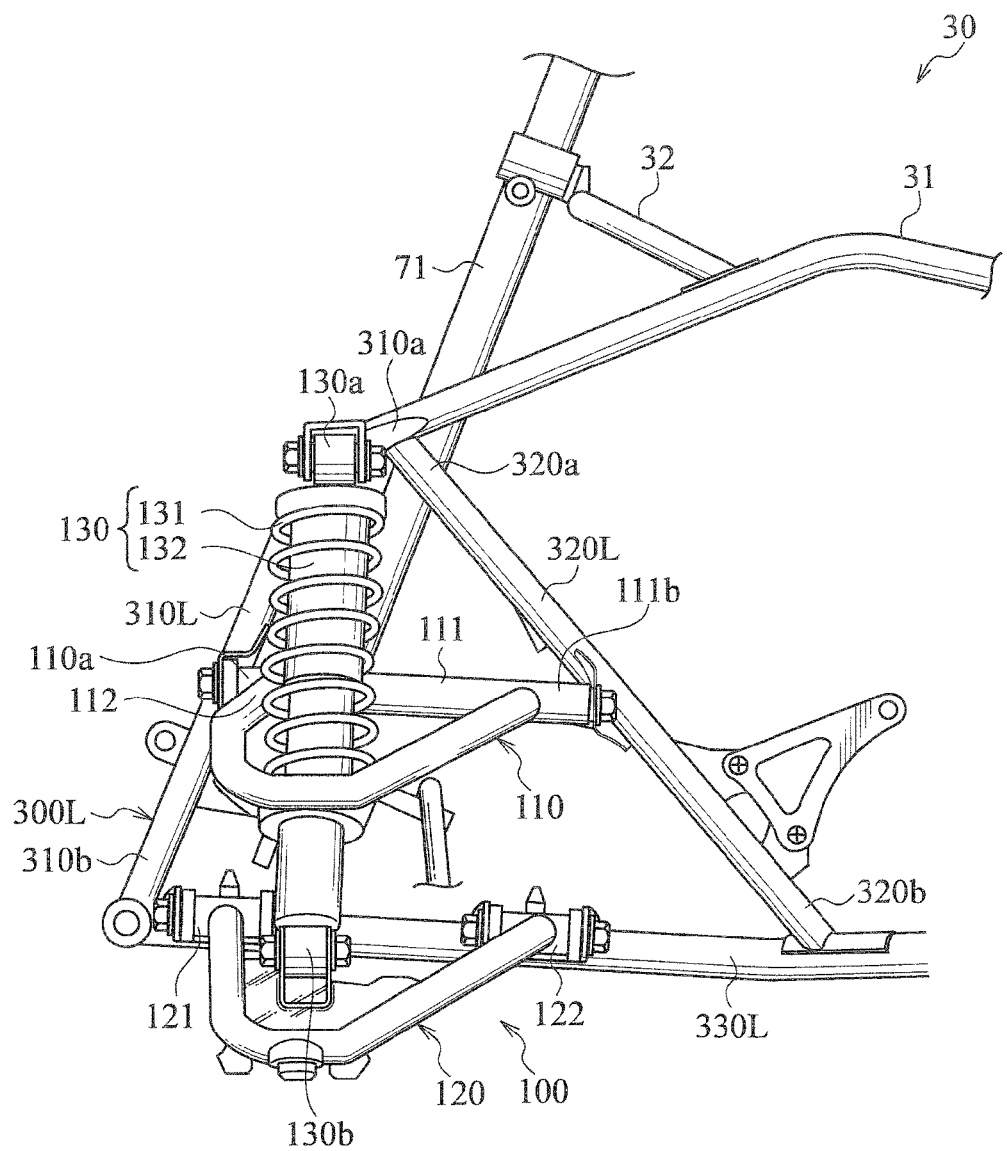
FIG. 3 is a left side view of a double wishbone type suspension 100 and a front part of a body frame 30 in accordance with an embodiment of the invention.

FIG. 3 is a left side view of the double wishbone type suspension 100 and a front part of the body frame 30. As shown in FIG. 3, the double wishbone type suspension 100 is mounted to the body frame 30. In FIG. 3, shown is only a part of the double wishbone type suspension 100 provided on the left side of the all terrain vehicle 10.

The body frame 30 has a triangular frame part 300L formed into the shape of a triangle in side view of the vehicle. The double wishbone type suspension 100 is mounted to the triangular frame part 300L.

Concretely, the triangular frame part 300L includes a first frame 310L, a second frame 320L and a third frame 330L to form a triangular body frame.

The double wishbone type suspension 100 comprises an upper arm 110, a lower arm 120 and a shock absorber 130.

The upper arm 110 is pivotably supported on the first frame 310L and the second frame 320L so as to be swingable in the substantially vertical direction.

The lower arm 120 is pivotably supported on the third frame 330L so as to be swingable in the substantially vertical direction.

The shock absorber 130 comprises a coil spring 131 and a dumper unit 132. The cylindrical dumper unit 132 is inserted into the coil spring 131. An upper end 130a of the shock absorber 130 is supported on a suspension bracket 370 (not shown in FIG. 3; refer to FIG. 4) provided on the first frame 310L. In the embodiment, the suspension bracket 370 forms a first cross member. A lower end 130b of the shock absorber 130 is supported on the lower arm 120.

The upper arm 110 and the lower arm 120 are formed from a pipe member, which is bent. The upper arm 110 includes a pivotably supported part 111, which is pivotably supported on the first frame 310L and the second frame 320L. The pivotably supported part 111 is formed from a member extending along a back and forth direction of the vehicle. In the embodiment, the pivotably supported part 111 is formed from a cylindrical pipe member. A front end part 111a of the pivotably supported part 111 is pivotably supported on the first frame 310L. A rear end part 111b of the pivotably supported part 111 is pivotably supported on the second frame 320L.

Further, an arm front end part 112 connected to the front end part 111a of the pivotably supported part 111 is bent toward the rear end part 111b, that is, to the rear side of the all terrain vehicle 10.

The lower arm 120 is supported on the third frame 330L. Concretely, the lower arm 120 includes pivotably supported parts 121 and 122. The pivotably supported part 121 is formed at the front end of the lower arm 120. The pivotably supported part 122 is formed at the rear end of the lower arm 120. The pivotably supported parts 121 and 122 are pivotably supported on the third frame 330L.

Moreover, in the embodiment, formed is an upper frame 31 continuously to the first frame 310L. The upper frame 31 is provided with a steering shaft supporting pipe 32 for rotatably supporting the steering shaft 71 (refer to FIG. 3).

(2.2) Shape of Body Frame

Figure 4:
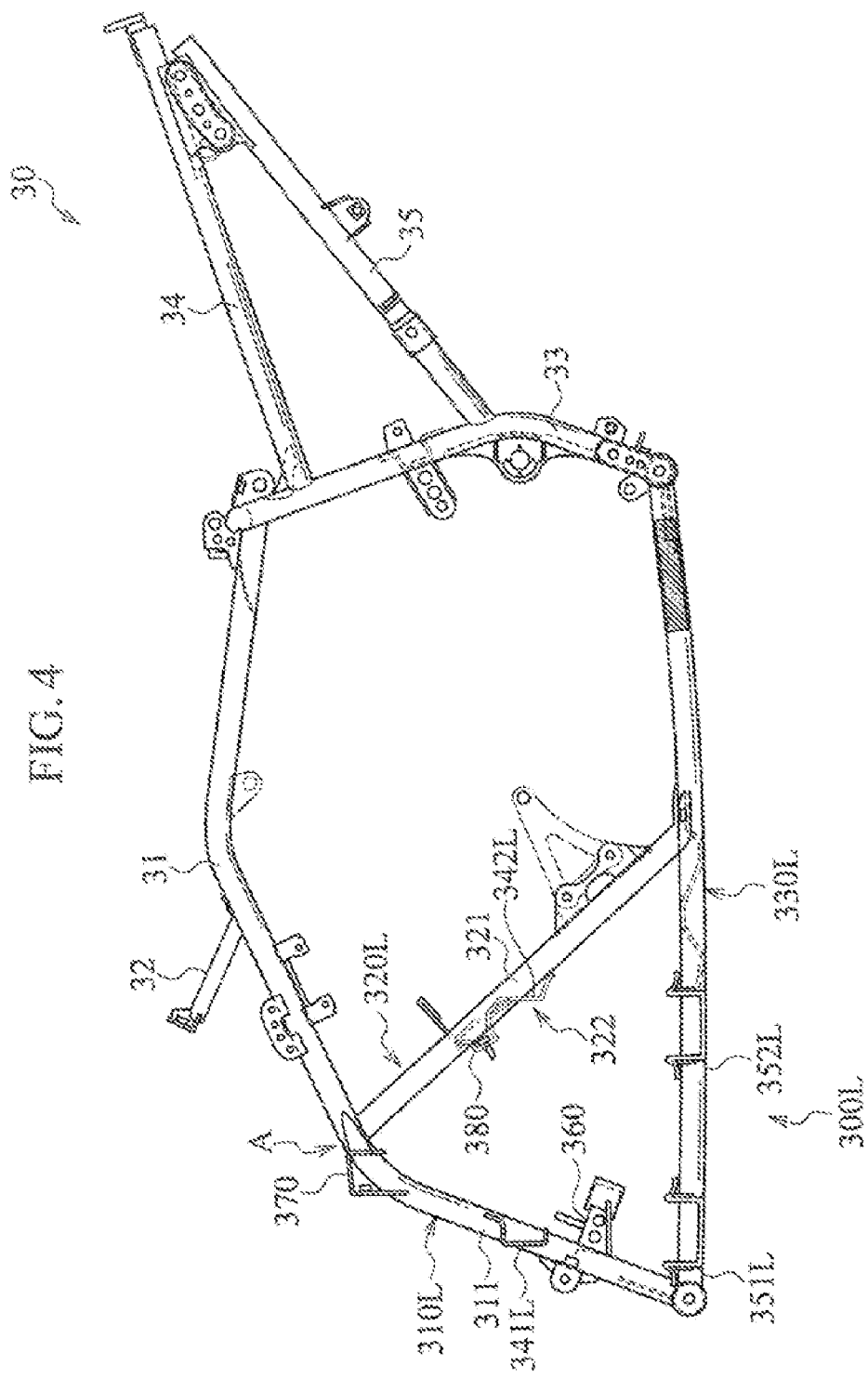
FIG. 4 is a left side view of a body frame 30 in accordance with an embodiment of the invention.
Figure 5:
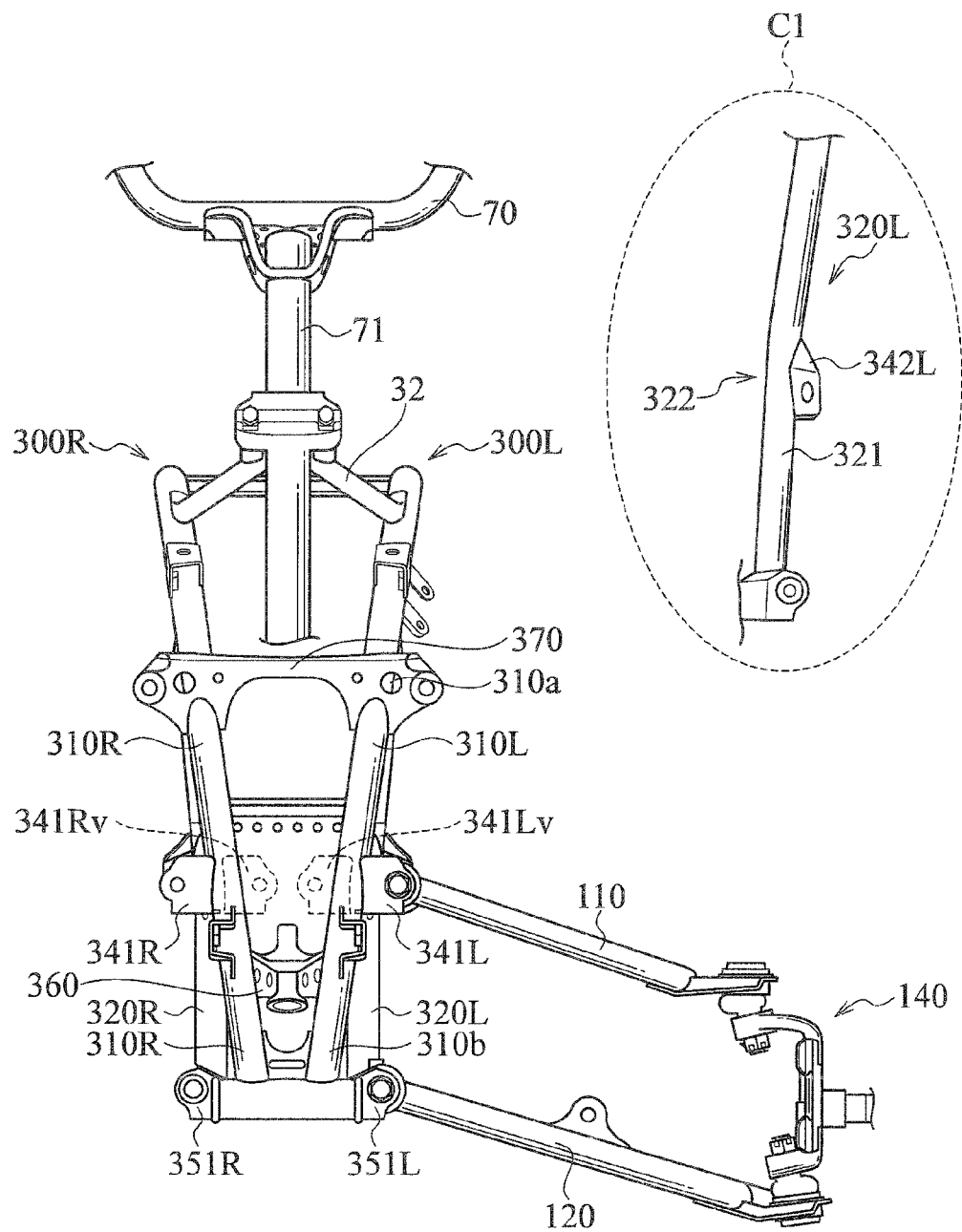
FIG. 5 is a front view of a body frame 30 in accordance with an embodiment of the invention.

Now, described will be a shape of the body frame 30. FIG. 4 is a left side view of the body frame 30. FIG. 5 is a front view of the body frame 30.

(2.2.1) Shape of Side Surface

As shown in FIG. 4, in a front part of the body frame 30, formed is a pair of right and left triangular frame parts 300L and 300R (not shown in FIG. 4; refer to FIG. 5). The triangular frame part 300L is formed from the first frame 310L, the second frame 320L and the third frame 330L.

The first frame 310L forms a front end part of the body frame 30. The first frame 310L extends downward to the front side of the all terrain vehicle 10.

The second frame 320L is connected to the first frame 310L and the third frame 330L. The second frame 320L extends downward to the rear side of the all terrain vehicle 10 from an upper end 310a of the first frame 310L.

The third frame 330L is connected to a lower end 310b of the first frame 310L and a lower end 320b of the second frame 320L. The third frame 330L extends to the rear side of the all terrain vehicle 10.

The first frame 310L is provided with an upper bracket 341L for pivotably supporting the front end part 111a of the pivotably supported part 111. The upper bracket 341L is connected to the first frame 310L.

Similarly, the second frame 320L is provided with an upper bracket 342L for pivotably supporting the rear end part 111b of the pivotably supported part 111. The upper bracket 342L is connected to the second frame 320L. Concretely, a shaft (not shown) is inserted into the upper bracket 341L, the upper bracket 342L and the pivotably supported part 111 to pivotably support the pivotably supported part 111 of the upper arm 110.

The third frame 330L is provided with a lower bracket 351L and a lower bracket 352L. The lower bracket 351L and the lower bracket 352L are connected to the third frame 330L.

The lower bracket 351L pivotably supports a pivotably supported part 121 of the lower arm 120. Concretely, a bolt (not shown) is inserted into the lower bracket 351L and the pivotably supported part 121 to pivotably support the pivotably supported part 121 of the lower arm 120.

The lower bracket 352L pivotably supports a pivotably supported part 122 of the lower arm 120. Concretely, a bolt (not shown) is inserted into the lower bracket 352L and the pivotably supported part 122 to pivotably support the pivotably supported part 122 of the lower arm 120.

Further, the first frame 310L is provided with a steering bracket 360 for rotatably supporting the steering shaft 71. The steering bracket 360 is connected to the first frame 310L and the first frame 310R (not shown in FIG. 4; refer to FIG. 5). In the embodiment, the steering bracket 360 forms a steering shaft supporting part.

Moreover, the first frame 310L is provided with a suspension bracket 370. The suspension bracket 370 supports an upper end 130a of the shock absorber 130. In the embodiment, the suspension bracket 370 is provided at a part of a top A of the triangular frame part 300L. That is to say, the upper end 130a of the shock absorber 130 is supported at the top A of the triangular frame part 300L, which is a connecting part of the first frame 310L and the second frame 320L, concretely, at a top part of a triangle formed from the triangular frame part 300L.

The first frame 310L and the second frame 320L correspond to oblique side parts of the triangular frame part 300L. In the embodiment, provided is no frame connecting the first frame 310L and the second frame 320L (no center frame) other than the third frame 330L corresponding to a bottom side of the triangular frame part 300L.

That is to say, a middle part 311 of the first frame 310L and a middle part 321 of the second frame 320L are connected only via a pivotably supported part 111 (refer to FIG. 3) of the upper arm 110.

The upper frame 31 is provided continuously to the first frame 310L in the embodiment. Concretely, the upper frame 31 is provided on the rear side of the top A of the all terrain vehicle 10. The upper frame 31 is formed into one body with the first frame 310L in the embodiment. The upper frame 31 and the first frame 310L, however, may be formed from different members, of course. The upper frame 31 is provided with a steering shaft supporting pipe 32.

The rear end of the first frame 310L is connected to a vertical frame 33 extending in the vertical direction of the all terrain vehicle 10.

The vertical frame 33 is also connected to the third frame 330L. The vertical frame 33 is further connected to rear frames 34 and 35.

(2.2.2) Shape of Front Surface

As shown in FIG. 5, on the left side of the steering shaft 71 to which the handle 70 is mounted, provided is the triangular frame part 300L. On the other hand, the triangular frame part 300R is provided on the right side of the steering shaft 71.

The steering shaft 71 is rotatably supported on the steering shaft supporting pipe 32 bridged over the first frame 310L and the first frame 310R.

The suspension bracket 370 is connected to the first frames 310L and 310R. The suspension bracket 370 supports the upper ends 130a (refer to FIG. 3) of the shock absorbers 130 provided respectively on the left and right sides of the all terrain vehicle 10. The suspension bracket 370 connects vicinities of a pair of tops A (refer to FIG. 4) of the triangular frame parts 300L and 300R, the top A being a connecting part of the first frame 310L and the second frame 320L.

In the embodiment, the suspension bracket 370 is connected to the outer circumferential sides of the triangular frame parts 300L and 300R.

The first frame 310L is provided with the upper bracket 341L for pivotably supporting the upper arm 110. Similarly, the first frame 310R is provided with an upper bracket 341R for pivotably supporting a right upper arm (not shown). The upper bracket 341L (341R) is provided on the outer side of the first frame 310L (310R) and the second frame 320L (320R) in the vehicle width direction.

On the lower end of the triangular frame part 300L, provided is a lower bracket 351L. Concretely, the lower bracket 351L is provided on the third frame 330L (refer to FIG. 4) to pivotably support the lower arm 120. A lower bracket 351R having the shape substantially symmetrical to the lower bracket 351L is provided on the right side of the steering shaft 71.

A hub carrier 140 is rotatably supported on the outer ends of the upper arm 110 and the lower arm 120 in the vehicle width direction.

The steering bracket 360 is connected to the first frame 310L and the first frame 310R. The steering bracket 360 is provided between the upper bracket 341L (341R) and the lower bracket 351L (351R).

That is to say, the steering bracket 360 is provided between a place where the upper arm 110 is pivotably supported on the first frame 310L (310R) and the lower end 310b of the first frame 310L (310R).

Further, a space between the lower ends 310b of the first frames 310L and 310R is narrower than a space between the upper ends 310a of the first frames 310L and 310R. That is to say, a space between the first frames 310L and 310R is arranged to be tapered from the upper end 310a to the lower end 310b.

Moreover, as shown in FIGS. 4 and 5, the second frames 320L and 320R have bending parts 322 bent projectingly to the inner side in the vehicle width direction. In a dotted circle C1 in FIG. 5, shown is a shape of the second frame 320L in front view of the body frame 30.

Concretely, the bending part 322 is formed on the middle part 321 of the second frame 320L (320R). The bending part 322 is located in the vicinity of a part, which pivotably supports the rear end part 111b of the pivotably supported part 111 included in the upper arm 110, concretely, the upper bracket 342L.

(2.3) Shape of Steering Shaft Supporting Part

Figure 6:
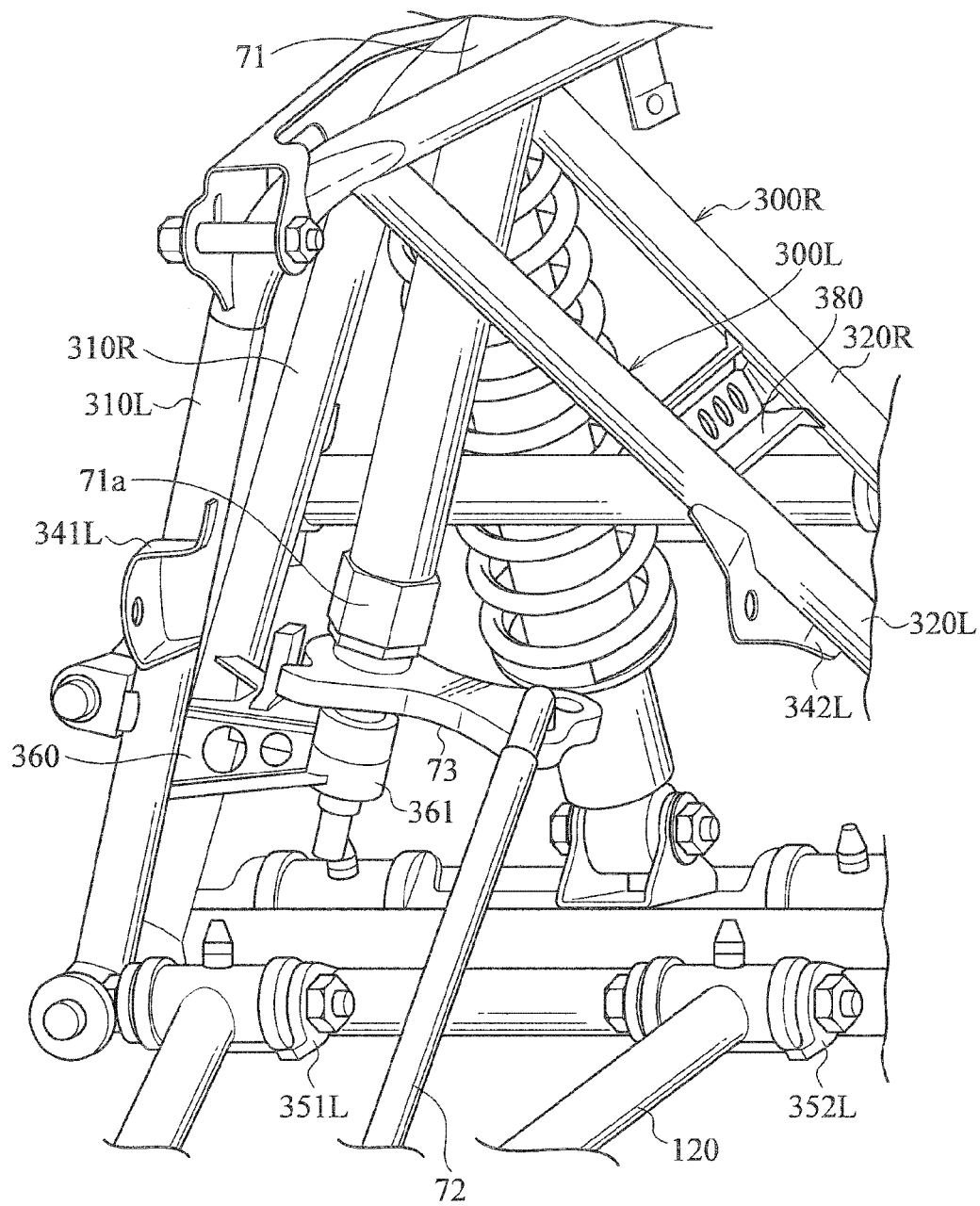
FIG. 6 is a perspective view of the vicinity of a steering bracket 360 in accordance with an embodiment of the invention.

FIG. 6 is a perspective view of the vicinity of the steering bracket 360 forming the steering shaft supporting part in the embodiment. In FIG. 6, omitted from drawing are the upper arm 110, the shock absorber or the like, which are provided on left side of the all terrain vehicle 10.

As shown in FIG. 6, the steering bracket 360 rotatably supports the steering shaft 71. Concretely, the steering bracket 360 includes a circular part 361 into which the steering shaft 71 is inserted. The steering bracket 360 is provided so as to be bridged over the first frames 310L and 310R.

The steering shaft 71 extends between the pair of right and left triangular frame parts 300L and 300R in the vertical direction. A lower end 71a of the steering shaft 71 is connected to a pitman arm 73. In the pitman arm 73, formed is an insertion hole (not shown) into which the steering shaft 71 is inserted. The pitman arm 73 rotates together with the steering shaft 71 when the handle 70 is operated.

An end of the pitman arm 73, which is opposite to an end provided with the insertion hole, is connected to the tie rod 72. The tie rod 72 is connected to the hub carrier 140 (refer to FIG. 5).

In the embodiment, the cross member 380 is provided between the second frames 320L and 320R. The cross member 380 connects the pair of second frames 320L and 320R. The cross member 380 forms a second cross member in the embodiment.

The cross member 380 connects the second frames 320L and 320R in the vicinity of a place where the upper arm 110 is pivotably supported on the second frame 320L (320R). Concretely, the cross member 380 connects the second frames 320L and 320R between the place where the upper arm 110 is pivotably supported on the second frame 320L (320R) and the upper ends 320a of the second frames 320L and 320R.

Operation and Effect

In accordance with the all terrain vehicle 10, the body frame 30 includes the triangular frame parts 300L and 300R. Further, the upper arm 110 is pivotably supported on the first frame 310L and the second frame 320L, which form the triangular frame part 300L (300R). Moreover, the lower arm 120 is pivotably supported on the third frame 330L forming the triangular frame part 300L.

Accordingly, the shape of the triangular frame part 300L and the upper arm 110 connected to the first frame 310L and the second frame 320L allow rigidity necessary for the body frame 30 to be secured.

Further, in the embodiment, provided is no frame connecting the first frame 310L and the second frame 320L other than the third frame 330L corresponding to the bottom side of the triangular frame part 300L. That is to say, the middle part 311 of the first frame 310L and the middle part 321 of the second frame 320L are connected only through the pivotably supported part 111 while the conventional center frame is not provided. This allows lightening of the all terrain vehicle 10 and reduction in manufacturing costs to be achieved.

In the embodiment, the first frame 310L pivotably supports the front end part 111a of the pivotably supported part 111 included in the upper arm 110 while the second frame 320L pivotably supports the rear end part 111b of the pivotably supported part 111. That is to say, the front and rear parts of the upper arm 110 are pivotably supported on the triangular frame part 300L. This improves rigidity in mounting the upper arm 110.

Moreover, in the embodiment, the upper end 130a of the shock absorber 130 is supported at the top A of the triangular frame part 300L, concretely, a connection part of the first frame 310L and the second frame 320L. This allows rigidity in mounting the shock absorber 130 to be improved.

Furthermore, in the embodiment, the pivotably supported part 111 of the upper arm 110 is formed from a member extending along the back and forth direction of the vehicle. Accordingly, the pivotably supported part 111 can provide a function equal to a frame (a center frame) connecting the first frame 310L and the second frame 320L. That is to say, the pivotably supported part 111 formed from a member extending along the back and forth direction of the vehicle allows rigidity of the triangular frame part 300L to be further improved.

In the embodiment, the steering bracket 360 is provided so as to be bridged over the first frames 310L and 310R. The steering bracket 360 supports the steering shaft 71 extending between the pair of right and left triangular frame parts 300L and 300R in the vertical direction. The steering bracket 360 is provided between a place where the upper arm 110 is pivotably supported on the first frame 310L and the lower end 310b of the first frame 310L.

Accordingly, a space necessary to support the lower part of the steering shaft 71 can be reduced while the steering shaft 71 can be certainly supported.

Moreover, in the embodiment, provided is the cross member 380 for connecting the pair of right and left second frames 320L and 320R. The cross member 380 connects the second frames 320L and 320R in the vicinity of a place where the upper arm 110 is pivotably supported on the second frame 320L (320R). Concretely, the cross member 380 connects the second frames 320L and 320R between the place where the upper arm 110 is pivotably supported on the second frame 320L (320R) and the upper end 320a of the second frame 320L (320R).

This allows rigidity of the triangular frame parts 300L and 300R, particularly, rigidity in the vicinity of the upper arm 110 where a load is added to be effectively improved.

Furthermore, in the embodiment, the second frame 320L (320R) includes the bending part 322 bent projectingly to the inner side in the vehicle width direction. The bending part 322 is formed at the middle part 321 of the second frame 320L. Concretely, the bending part 322 is located in the vicinity of the upper bracket 342L pivotably supporting the rear end part 111b of the pivotably supported part 111 of the upper arm 110.

Accordingly, providing the upper bracket 342L pivotably supporting the upper arm 110 at a place of the bending part 322 allows rigidity in mounting the upper bracket 342L to be easily secured. Moreover, the upper bracket 342L can function as a gusset member of the triangular frame part 300L (300R).

In addition, the pivotably supported part 111 of the upper arm 110 is provided on the outer side of the first frame 310L and the second frame 320L in the vehicle width direction in the embodiment. Accordingly, the upper arm 110 can be more easily detachable to the triangular frame part 300L (300R) than a case that the pivotably supported part 111 is provided on the inner side of the first frame 310L and the second frame 320L in the vehicle width direction.

Other Embodiments

Contents of the invention have been disclosed through the embodiment of the invention, as described above. The description and drawings forming a part of the disclosure should be understood as no limitation of the invention. The disclosure will reveal various kinds of alternative embodiments for the person skilled in the art.

For example, the pivotably supported part 111 of the upper arm 110 is provided on the outer side of the first frame 310L and the second frame 320L in the vehicle width direction in the above-mentioned embodiment. The pivotably supported part 111, however, may be provided on the inner side of the first frame 310L and the second frame 320L in the vehicle width direction. For example, instead of the upper bracket 341L (341R) pivotably supporting the pivotably supported part 111, provided may be an upper bracket 341Lv (341Rv), as shown in a dotted line in FIG. 5.

The length of the upper arm 110 can be made long in the case of providing the pivotably supported part 111 on the inner side of the first frame 310L and the second frame 320L in the vehicle width direction. This allows the length of a stroke of the double wishbone type suspension 100 to be easily increased.

Further, an angle of swing of the upper arm 110 can be decreased more than a case of providing the pivotably supported part 111 on the outer side in the vehicle width direction when the length of a stroke is not increased but fixed. This allows frictional wear of the upper arm 110 to be restrained.

Moreover, in the above-mentioned embodiment, provided are the steering bracket 360 and the cross member 380. They may be not necessarily provided, however.

In the embodiment, the upper arm 110 includes the pivotably supported part 111 while the lower arm 120 has no portion corresponding to the pivotably supported part 111. The upper arm 110, however, may be in the shape similar to the lower arm 120. That is to say, the front end part 111a and the rear end part 111b of the pivotably supported part 111 may be separated into the front and the rear so as to be in the shape independent of each other. In this case, the front end part 111a is pivotably supported on the first frame 310L while the rear end part 111b is pivotably supported on the second frame 320L.

As described above, it goes without saying that the invention includes various kinds of embodiments not described above. Accordingly, matters specific to the invention in accordance with Claims, which are proper from the above description, only defines a technical range of the invention.

What is claimed is:

1. An all terrain vehicle comprising:
    a front wheel;
    a body frame including a triangular frame portion having the shape of a triangle in a side view of the vehicle; and
    a double wish bone suspension arranged to suspend the front wheel; wherein
    the triangular frame portion includes:
        a first frame extending downward toward a front of the vehicle;
        a second frame extending downward toward a rear of the vehicle from an upper end of the first frame; and
        a third frame connected to a lower end of the first frame and a lower end of the second frame;
    the double wishbone suspension includes:
        an upper arm arranged to be pivotably supported on the first frame and the second frame to be swingable in upward and downward directions; and
        a lower arm pivotably supported on the third frame to be swingable in the upward and downward directions; wherein
    the upper arm includes a pivotably supported portion directly connected to the first frame and directly connected to the second frame such that the pivotably supported portion is arranged to pivot in the upward and downward directions;
    the first frame pivotably supports a front end portion of the pivotably supported portion; and
    the second frame pivotably supports a rear end portion of the pivotably supported portion.

2. The all terrain vehicle according to claim 1, wherein the pivotably supported portion extends along a longitudinal direction of the vehicle.

3. The all terrain vehicle according to claim 2, wherein a middle portion of the first frame and a middle portion of the second frame are connected to each other only through the pivotally supported portion.

4. The all terrain vehicle according to claim 1, wherein the pivotably supported portion is provided on an outer side of the first and second frames in a vehicle width direction.

5. The all terrain vehicle according to claim 1, wherein the pivotably supported portion is provided on an inner side of the first and second frames in a vehicle width direction.

6. The all terrain vehicle according to claim 1, wherein the double wishbone suspension includes a shock absorber; and an upper end of the shock absorber is supported in a vicinity of a top of the triangular frame portion, the top being a connection portion of the first frame and the second frame.

7. The all terrain vehicle according to claim 1, wherein the body frame includes a pair of the triangular frame portions respectively defining a right triangular frame portion and a left triangular frame portion.

8. The all terrain vehicle according to claim 7, further comprising a first cross member arranged to connect a to of the right triangular frame portion and a to of the left triangular frame portion, the tops being a connection portion of the first and second frames.

9. The all terrain vehicle according to claim 8, wherein
the double wishbone suspension includes a shock absorber; and
an upper end of the shock absorber is supported on the first cross member.

10. The all terrain vehicle according to claim 9, wherein the first cross member is connected to an outer circumferential side of the right triangular frame portion and the left triangular frame portion.

11. The all terrain vehicle according to claim 8, further comprising: a second cross member arranged to connect the pair of the second frames of the right triangular frame portion and the left triangular frame portion.

12. The all terrain vehicle according to claim 11, wherein the second cross member connects the pair of the second frames in a vicinity of the place where the upper arm is pivotably supported on the second frame.

13. The all terrain vehicle according to claim 11, wherein the second cross member connects the pair of the second frames between the place where the upper arm is supported on the second frame and an upper end of the second frame.

14. The all terrain vehicle according to claim 7, further comprising:
a steering shaft arranged to mount a handle arranged to steer the front wheel; and
a steering shaft supporting portion arranged to support the steering shaft; wherein
the steering shaft extends between the right triangular frame portion and the left triangular frame portion in a vertical direction and the steering shaft supporting portion is provided on the pair of the first frames of the right triangular frame portion and the left triangular frame portion.

15. The all terrain vehicle according to claim 7, wherein the second frame includes a bent portion arranged to bend towards an inner side in a vehicle width direction, and
the bent portion is provided at a middle portion of the second frame.

16. The all terrain vehicle according to claim 15, wherein the bent portion is located in a vicinity of the rear end portion of the pivotably supported portion.

17. The all terrain vehicle according to claim 1, further comprising:
a steering shaft arranged to mount a handle arranged to steer the front wheel; and
a steering shaft supporting portion arranged to support the steering shaft; wherein
the steering shaft supporting portion is provided in the first frame.

18. The all terrain vehicle according to claim 17, wherein the steering shaft supporting portion is provided between a place where the upper arm is pivotably supported on the first frame and the lower end of the first frame.

* * * * *